Feb. 28, 1961 B. B. ELLIS 2,972,804
METHOD OF MAKING STEPPED-LAP CORE FOR INDUCTIVE APPARATUS
Filed Dec. 29, 1955 3 Sheets-Sheet 1

WITNESSES
Edwin E. Bassler
Leon M. Garman

INVENTOR
Belyin B. Ellis
BY Ezra N. Savage
ATTORNEY

Feb. 28, 1961 B. B. ELLIS 2,972,804
METHOD OF MAKING STEPPED-LAP CORE FOR INDUCTIVE APPARATUS
Filed Dec. 29, 1955 3 Sheets-Sheet 2

United States Patent Office 2,972,804
Patented Feb. 28, 1961

2,972,804

METHOD OF MAKING STEPPED-LAP CORE FOR INDUCTIVE APPARATUS

Belvin B. Ellis, Lackawannock Township, Mercer County, Pa., assignor to Westinghouse Electric Corporation, East Pittsburgh, Pa., a corporation of Pennsylvania Filed Dec. 29, 1955, Ser. No. 556,152

9 Claims. (Cl. 29—155.57)

The invention relates, generally, to cores for inductive apparatus and, more particularly, to cores provided with joints adapting them to fit around preformed coils.

In the art, cores having joints to enable them to be applied to preformed coils or the preformed coils applied to them have been utilized with a fair measure of success. However, in cut cores the losses at the joints are high enough to add considerably to the cost of operation of transmission systems, and raise the problem of how to get the losses down.

There are a number of well-known types of joints in use at the present time. The butt joint in which the flux flows in the laminations passes from end to end at the joint. Cores having butt joints have served their time well and will continue to be used, but cost of manufacture and losses can be reduced by the core to be described hereinafter.

Another core used employs a butt lap joint. In this core, a number of laminations are arranged in groups, and the groups have square end faces. The groups are superimposed on one another with the square ends offset. The square ends of the groups are then fitted together somewhat like a mortise and tenon joint to make a closed loop around a preformed coil. This type of core presents a problem in fitting to get proper butt contact to accommodate an effective flow of the flux and low losses.

There may be some modifications of these cores but they all present the same problems. Further, they always invite cost reduction.

The object of this invention is to provide a method of making a core having a low loss stepped-lap joint that enables the fitting of the core on a preformed winding or coil.

It is also an object of the invention to provide a method of making a core having a stepped-lap joint that has low losses and that is economical to manufacture.

A further object of the invention is to provide for annealing the core after performing all the manufacturing operations that introduce loss producing strains in the magnetic strip from which the core is made.

Other objects of the invention will, in part, be obvious and will, in part, appear hereinafter.

The invention, accordingly, comprises the several steps and the relation and order of one or more of such steps with respect to each of the others; the apparatus embodying features of construction, combinations and arrangement of parts adapted to effect such steps, and the article which possesses the characteristics, relation of elements, all as exemplified in the detailed disclosure hereinafter set forth and the scope of the application of which will be indicated in the claims.

For a fuller understanding of the nature and objects of the invention, reference should be had to the following detailed description taken in connection with the accompanying drawings, in which.

Figure 1:
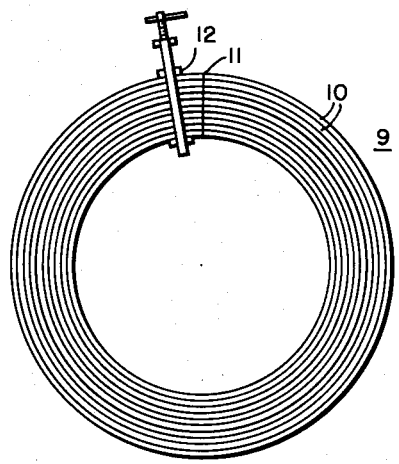
Figure 1 is a view in end elevation of a wound core showing it clamped adjacent a cut.

Referring now to the drawings and Fig. 1 in particular, a wound core shown generally at 9 is made by winding a plurality of turns 10 of oriented magnetic strip material on one another. The number of turns of oriented magnetic strip material and the width of the strip will depend on the design and expected capacity of the core 9. The diameter of the core 9 will be to a great extent determined by the size of the preformed coil or winding 8, with which it is to be utilized.

In order to apply the core to a preformed coil, it is cut along a line 11. The direction of the cut, relative to the laminations 10, may be varied to meet the designer's objective. Usually the cut will be along the diameter of the core, as shown in Fig. 1. In this embodiment of the invention, the core is illustrated as substantially circular, but such shape is not necessary as a loop of any suitable shape may be employed.

Figure 2:
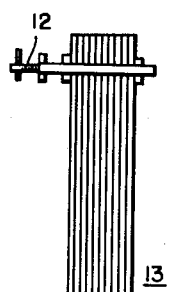
Fig. 2 is a view in end elevation of the core shown in Fig. 1, with the main portion of the core straightened to arrange the laminations in stepped relationship.

In order to make a stepped-lap arrangement of the laminations to provide a low loss joint, the laminations are clamped in fixed relationship to one another on one side of the cut 11 by means of a clamp 12. After the clamp 12 has been applied, the laminations of the core are straightened out, as shown generally at 13 in Fig. 2. It will be obvious that the straightening out of the main portion of the core will arrange the laminations 10 in stepped relationship, as shown at 14.

If it is desired to step the laminations more in one operation than effected by straightening out the group or stack of laminations, they may be bowed or curved in the opposite direction from the curve of the first winding. Other operations of this type may be introduced to accelerate the making of the core. Such operations will be obvious from the description of the present method.

Figure 3:
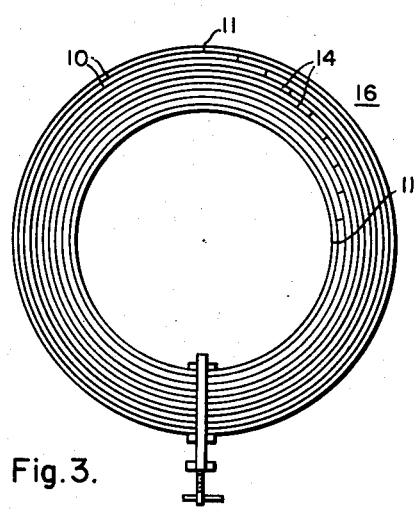
Fig. 3 is a view in end elevation of the wound core shown in Fig. 2 curled up to form a substantially circular core with the laminations forming stepped-lap joints.

A second clamp 15 is now applied to the other end of the straight section 13 of the core. The clamp 12 is released and the straight section of the core 13 curled up to form a loop, as shown in Fig. 3. As the laminations curl up, the portions of the laminations previously in the straight section 13 will move relative to one another and become disposed in stepped relationship to match the stepped laminations shown generally at 14.

The operation for arranging the lamination ends in stepped arrangement may be repeated a number of times to get the stepped relationship required. It has been possible to get the end portions stepped to the extent of 6 times the thickness of the laminations by repeating the operation twice.

If now the stepped ends of the laminations are fitted together, a series of stepped-lap joints will be formed in the laminations, as shown generally at 16. As will be observed, the laminations, which are the same in number as the turns of the coil, are disposed with each lamination forming a joint which is offset or staggered relative to the joint in the next adjacent lamination. The end of one lamination laps the end of the next adjacent lamination. Accordingly, the joint comprises a number of laminations, the ends of which are arranged in a stepped order, the end portions of one lamination lapping the end portion of the next lamination forming a joint which may be described as a stepped-lap joint because of the arrangement of the laminations.

In some instances, the ends of the individual laminations may abut one another; however, this is not essential. The ends of the individual laminations may be spaced. Satisfactory results were obtained with the ends of the laminations spaced from one another as much as one or two thicknesses of the laminations. The lamination ends in one layer should overlap the lamination ends in the next layer by a substantial amount. It has been found in practice that excellent results have been obtained in cores when the lamination ends overlap in the stepped-lap joint to the extent of about six times the thickness of the lamination.

It has been established by test that when the ends of the laminations overlap from 1.5 times the thickness of the sheet from which the lamination is made to 5 times the thickness, or the ratio of lap to thickness is 1.5 to 1 up to 5 to 1, there is a continuous improvement in both apparent watt (A.W.) losses and true watt (T.W.) losses. The improvement, when plotted, is a linear relationship between A.W. and T.W. Further, it has been found that when the ratio of lap to cross-sectional area of the lamination is greater than 6 to 1, there is very little improvement in both A.W. and T.W. Tests revealed that when the ratio is 6 to 1, the core generally is within 13% in A.W. and 1% in T.W. of the losses of a wound core of the same material and without a joint. Therefore, there is little to be gained by increasing the ratio over 6 to 1.

The distance the joint in one lamination will be offset or staggered with relation to the joint in the next adjacent lamination may be varied appreciably, depending on the design requirements. A very satisfactory core has been produced with joints in adjacent laminations or groups of laminations spaced and the laminations overlapped to a distance of about six times the thickness of the lamination or the build-up of laminations respectively.

The core may now be clamped at the joint 11 and shaped to conform to the preformed coil to which it is to be applied. Usually the cores are shaped similar to the one shown in Fig. 5. After the core has been shaped, it will be annealed to relieve stresses, in accordance with some suitable process well known in the art and, therefore, need not be described.

Figure 9:
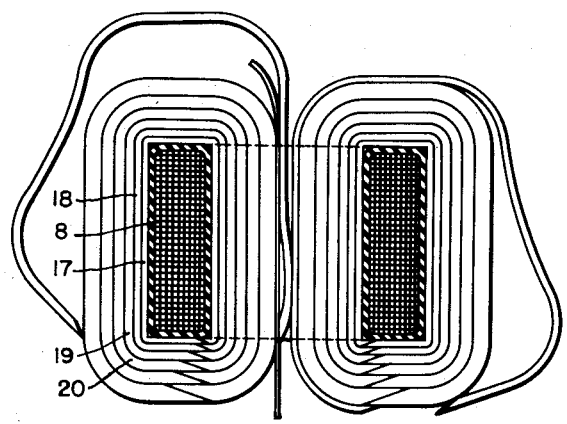
Fig. 9 is a view partly in section and partly in side elevation of a coil and sections of the core showing how the core may be assembled around the coil.
Figure 10:
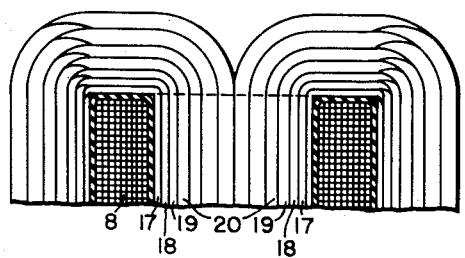
Fig. 10 is a view partly in section and partly in side elevation of a core and coil showing a stepped-lap joint at the corner of the core.
Figure 11:
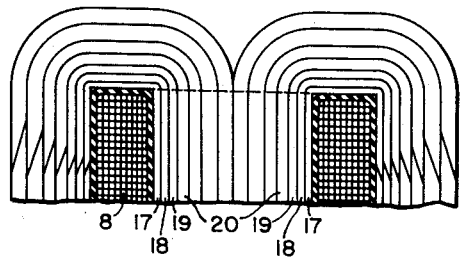
Fig. 11 is a view partly in section and partly in side elevation of a core and coil showing a joint in the leg of the core.

The annealing may be performed after the core has been shaped and no more operations are to be performed which will introduce locked-in stresses in the iron of the core and, therefore, increase the losses in operation. After the core has been shaped and annealed, the joint may be opened and the laminations fitted through the preformed coil, as for example in Fig. 9, and the laminations fitted together to form the stepped-lap joint described hereinbefore. It has been found that the bending of the laminations to fit them around the coil is not severe enough to so strain the material that the losses in operation are appreciably higher.

When the core has a large number of laminations, the stepped-lap joint forming the main joint may extend through a rather substantial sector of the core.

Figure 4:
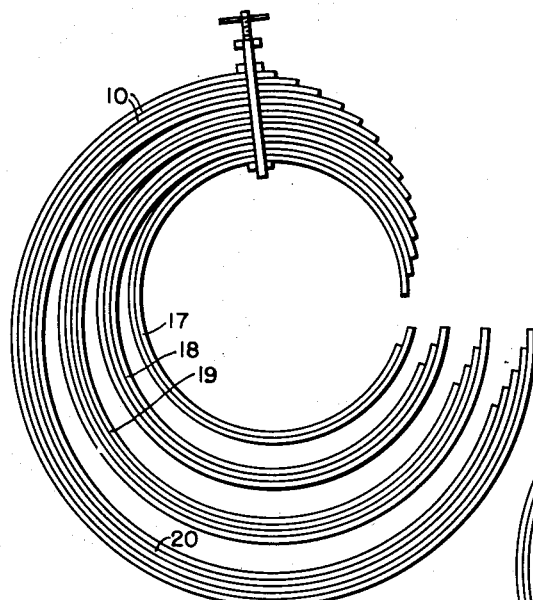
Fig. 4 is a view in end elevation of a wound and split core showing the laminations separated into groups with the ends disposed in stepped relationship.
Figure 6:
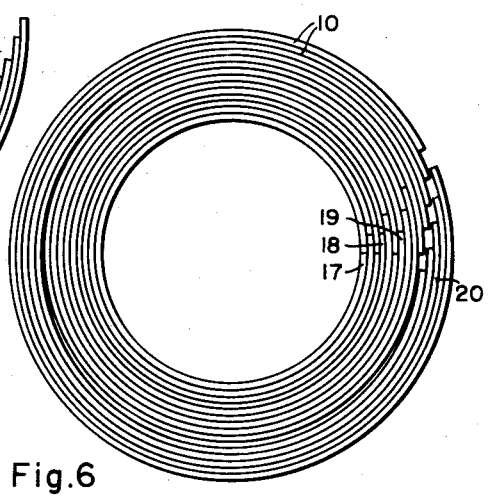
Fig. 6 is a view in end elevation of a core showing the laminations matching as they are brought end to end.

It has been found desirable in some instances to confine the stepped-lap joints of the individual laminations to the straight section of a yoke or leg. However, in some instances, it may be advantageous to make the joint on a corner. When desirable to make the joint in the yoke, the laminations will be arranged in groups, as shown in Fig. 4.

In this particular illustration, there are four groups, 17, 18, 19, and 20, shown. Group 17 has only two laminations; group 18, three; group 19, four; and group 20, five. However, this is only for convenience in illustration. The groups 17 to 20, inclusive, may include as many individual laminations as the designer may find preferable for his building operations and final product.

Since the laminations are all of the same gauge, standard jigs and devices may be made which will readily separate the desired number of laminations required for each group from the body of the core. When the laminations have been separated into the groups of the desired size, they may be manipulated in the manner described hereinbefore, either as individual groups, or as a whole, to arrange the individual laminations in stepped relationship.

If the groups of laminations are arranged in individual groups to get the required step relationship of the individual laminations, they may be assembled by superimposing the groups on one another in the relationship in which they were wound. If all the groups have been arranged while held together but with the groups kept separated by a jig or other device, then they are ready to be adjusted to locate the joints as desired.

Figure 5:
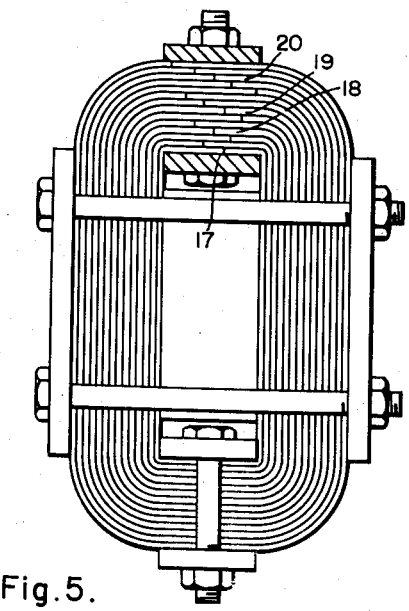
Fig. 5 is an end view of a wound core, the laminations of which have been arranged in groups and in stepped relationship to one another and shaped to form a core, the stepped-lap joints of which are wholly within the straight portions of a yoke section of the core.
Figure 7:
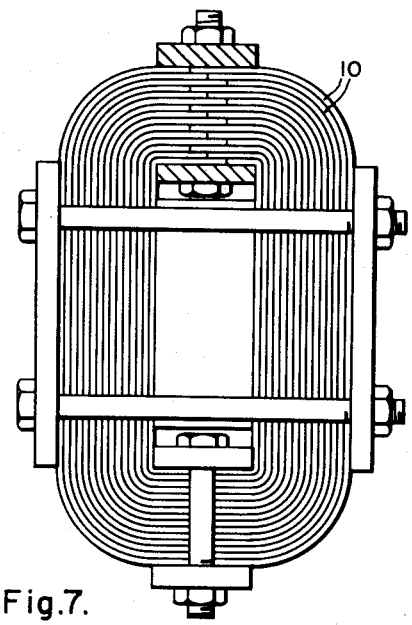
Fig. 7 is an end view of a wound core with a stepped-lap joint, the laminations being arranged in groups of equal numbers of laminations and the core shaped.
Figure 8:
Fig. 8 is a view in side elevation of the ends of a core arranged for fitting together to provide a stepped-lap joint.

Assuming now that the groups have been arranged to get the laminations 10 in the required stepped relationship as individual groups, then group 18 will be superimposed on group 17 with the stepped-lap joints of the groups substantially aligned. The same practice will be followed with groups 19 and 20. The result is that the stepped-lap joints will all now be located so that when the core is shaped as shown in Fig. 5, the stepped-lap joints will lie within the straight section of the upper yoke of the core. This greatly facilitates the holding of the members making the joint together and results in a low loss joint.

After a core made up of groups of laminations arranged to form stepped-lap joints has been fitted together to form a loop, the core having the stepped-lap joints is clamped and then shaped and annealed as mentioned hereinbefore. Many cores have been assembled in the manner described, and tests have been made to ascertain their efficiency. It has been found that this method of making cores lends itself to factory practice and renders unnecessary many of the expensive operations heretofore required.

It has been demonstrated that it is unnecessary to work the cut ends of the laminations to remove burrs since the burrs will be located in contact with an insulating layer provided on the magnetic strip. Further, during the annealing of the core, many of the burrs will be removed. Experience reveals that the remaining burrs will not cut through the insulation and do not, in any way, cause losses.

The fact that the laminations of the core are not bonded to one another by an adhesive means that when the core has been shaped and annealed, it consists of a number of reasonably flexible independent laminations or groups that may be taken apart and fitted through the window in the preformed windings and the ends of the laminations again matched to form stepped-lap joints, as shown in Fig. 5. It has been found that the laminations constituting the core may be distorted an amount sufficient to enable the fitting of them into the preformed coil without setting up any appreciable losses which result from stresses.

The ease and speed with which these cores may be disassembled and fitted through preformed coils lends itself to manufacturing operations. Further, a core manufactured in this way requires only one cut to enable it to be assembled on a performed coil. Therefore, such a core has only one overall joint to introduce losses. However, it is to be understood that in order to meet design requirements, more than one joint may be provided and the losses will be about in proportion to the number employed.

Another distinct advantage of this type of core is that the laminations do not have to be bonded to one another which greatly cuts the cost of manufacture. Further, a core with laminations free and overlapped as in this invention cuts the sound level during operation very appreciably which is a highly desirable characteristic. Also, submersion in oil dampens the "buzzing" at the joint and thus attenuates the sound level by 20 or 30 $db_{40}$. In order to convey some concept of the low losses and low sound level of this type of core, tests were made and the data obtained is recorded hereinafter:

*Stepped-lap joint*

|  | T.W./Lb. | A.W./Lb. |
| --- | --- | --- |
| Uncut Ring | .616 | .874 |
| Final with Joint Showing | .649 | 1.055 |
| Variations | 5½% | 21% |
| Epsteins | .695 |  |
| Magnetic Sheet Material of Grade | .8 | 2.2 |
|  | Joint Loose | Joint Tight |
| Sound Level $db_{40}$ in Air | 53 | 42 |

Sound Level $db_{40}$ in oil=33 in ambient of 30″.

The cores tested which gave the foregoing results were arranged in the manner illustrated in Fig. 5. In this particular test, the laminations had an overlap joint with a 6 to 1 ratio of spiral length to group build-up. The increased area of the joint, in this instance, 6 times, allowed a ⅙ induction and thus a ⅙ reluctance, and as evident from the table, this gave very excellent results. However, it is to be understood that these features may be varied greatly to meet any design requirements.

The test results were so good that the core, while it had a physical joint, gave magnetic results almost equivalent to a core without a physical joint. Of course, there were two contributing features namely, the stepped-lap joint and low residual stresses.

In constructing a jointed core, more than one joint may be employed. However, in order to get the low losses, all joints must be stepped-lap joints as described.

Since certain changes in carrying out the above process and certain modifications in the article which embody the invention may be made without departing from its scope, it is intended that all matter contained in the above description or shown in the accompanying drawings shall be interpreted as illustrative and not in a limiting sense.

I claim as my invention:

1. The method of making a wound type core, comprising the steps of winding a predetermined number of turns of oriented magnetic strip to form a core loop, cutting the core loop along a line at substantially right angles to the turns providing independent laminations, first restraining the laminations near the cut, partially unrolling the thus restrained laminations to substantially straighten a first portion of them, thereby arranging the laminations at the first unrestrained ends in stepped relationship, secondly restraining the laminations near the end remote from the point of first restraint, removing the restraint at the point where the first restraint is applied, rolling the laminations into substantially their original wound shape to arrange the laminations at the ends near the point of first restraint in stepped relationship to substantially match the stepped relationship of the ends of the laminations near the point of the second restraint, whereby the lamination's ends may be fitted to provide a stepped-lap contact of the laminations.

2. The method of making a wound core, comprising winding a predetermined number of turns of oriented magnetic strip to form a substantially ring-shaped core, cutting the ring-shaped core along a line substantially at right angles to the turns of the ring-shaped core providing independent ring-shaped laminations, first restraining the ring-shaped laminations at a point adjacent the point at which they are cut, partially unrolling the laminations to substantially straighten a portion of them, thereby arranging the laminations at the first unrestrained ends in stepped relationship, second restraining the laminations adjacent the end at which they are in stepped relationship to one another, releasing said laminations at said first mentioned point of restraint, rolling the laminations into substantially the original wound shape to arrange the laminations at the ends near the first point of restraint in stepped relationship to substantially match the stepped laminations at the ends near the second point of restraint, whereby the lamination ends may be fitted to provide a stepped-lap contact of the laminations, and repeating the restraining and partially unrolling operations to set the laminations in any predetermined relationship to make a stepped-lap arrangement of the ends of laminations.

3. The method of making a wound core, comprising winding a predetermined number of turns of oriented magnetic strip to form a substantially ring-shaped core, cutting the ring-shaped core to provide independent ring-shaped laminations, first clamping the ring-shaped laminations at a point adjacent the point at which they are cut, partially unrolling the laminations to arrange them at the first unclamped ends in stepped relationship, secondly clamping the laminations adjacent the first unclamped ends, releasing the first clamp, rolling the laminations into substantially the original wound shape to arrange the laminations at the last mentioned unclamped ends in stepped relationship to substantially match the stepped laminations of the first unclamped ends, whereby the lamination ends may be fitted to provide butt and lap contact of the laminations, clamping the ends of the laminations in a predetermined stepped-lap relationship, and shaping the clamped core to a predetermined shape.

4. The method of making a wound core, comprising winding a predetermined number of turns of oriented magnetic strip to form a substantially ring-shaped core, cutting the ring-shaped core to provide independent ring-shaped laminations, first clamping the ring-shaped laminations at a point adjacent the point at which they are cut, partially unrolling the laminations to substantially straighten a portion of them, thereby arranging the laminations at the first unclamped ends in stepped relationship, secondly clamping the laminations adjacent the first unclamped ends, releasing the first clamping of the laminations, rolling the laminations into substantially the original wound shape to arrange the laminations at the last mentioned unclamped ends in stepped relationship to substantially match the stepped laminations of the first unclamped ends, whereby the lamination ends may be fitted to provide butt and lap contact of the laminations, clamping the ends of the laminations in a predetermined stepped-lap relationship, shaping the clamped core to any predetermined shape, and annealing the shaped core to relieve stresses.

5. The method of making a wound core, comprising winding a predetermined number of turns of oriented magnetic strip to form a substantially ring-shaped core, cutting the ring-shaped core along a line substantially at right angles to the faces of the laminations to provide independent ring-shaped laminations, separating the laminations into a plurality of groups, each group having a plurality of laminations, first clamping the ring-shaped laminations in groups at a point adjacent the cut, partially unrolling the laminations to arrange the unclamped ends of the laminations in stepped relationship, secondly clamping the first free ends of the groups that have been arranged in stepped relationship, unclamping said first clamped ends and rolling the core to substantially its original form to arrange the last mentioned unclamped ends of the groups of laminations in stepped relationship, assembling the groups of laminations with stepped ends to make stepped-lap joints, and arranging the ends of the groups of laminations in substantial alignment.

6. The method of making a wound core comprising the steps of, winding a predetermined number of turns of oriented magnetic strip to form a substantially ring-shaped core, cutting the ring-shaped core to provide independent ring turns, dividing the independent ring turns into groups, displacing the cut in each turn in each group with respect to the cut in each adjacent turn in each group to provide a stepped-lap joint at the ends of the turns, arranging the groups of turns in substantially ring-shape with the ends of each turn opposite each other and with a stepped-lap joint in each group of turns overlapping a stepped-lap joint in each adjacent group of turns so that the stepped-lap joints in the various groups of turns provide a stepped joint completely across said core.

7. The method of making a wound core comprising the steps of, winding a predetermined number of turns of oriented magnetic strip to form a substantially ring-shaped core, cutting the ring-shaped core to provide independent ring turns, dividing the independent ring turns into groups, displacing the cut in each turn in each group with respect to each adjacent turn in each group to provide a stepped-lap joint at the ends of the turns, arranging the groups of turns in substantially ring-shape with the ends of each turn opposite each other and with a stepped-lap joint in each group of turns overlapping a stepped-lap joint in each adjacent group of turns so that the stepped-lap joints in the various groups of turns provide a stepped joint completely across said core, and shaping the ring to a desired shape other than ring shape.

8. The method of making a wound core comprising the steps of, winding a predetermined number of turns of oriented magnetic strip to form a substantially ring-shaped core, cutting the ring-shaped core to provide independent ring turns, dividing the independent turns into groups, displacing the cut in each turn in each group with respect to the cut in each adjacent turn in each group to provide a stepped-lap joint at the ends of the turns, arranging the groups of turns in substantially ring-shape with the ends of each turn opposite each other and with a stepped joint in each group of turns overlapping a stepped joint in each adjacent group of turns so that the stepped joints in the various groups of turns provides a stepped joint completely across the core, shaping the ring to a desired shape, and annealing the shaped core to relieve the stresses set up therein by the shaping step.

9. The method of providing a core and coil assembly comprising the steps of, winding a coil to a predetermined shape, said coil having a window therein for receiving a core, winding a predetermined number of turns of oriented magnetic strip to form a substantially ring-shaped core, cutting the ring-shaped core to provide independent ring turns in the core, dividing the ring turns into groups, displacing the cut in each turn in each group with respect to the cut in each adjacent turn in each group to provide a stepped-lap joint at the ends of the turns, reassembling the groups of turns with the cut ends of each group substantially in alignment with each other and with the end of each turn overlapping the cut in an adjacent turn so that the overlapping provides a stepped joint completely across the core, shaping the ring to a desired shape, annealing the shaped core to relieve the stresses set up therein by the shaping step, disassembling the shaped core in groups of turns, reassembling said groups of turns in the window of said coil with the ends of each turn substantially in alignment with each other, and with the cut in each turn overlapping the cut in each adjacent turn to provide a stepped lap joint in said core.

References Cited in the file of this patent

UNITED STATES PATENTS

| | | |
|---|---|---|
| 1,992,822 | Granfield | Feb. 26, 1935 |
| 2,290,680 | Franz | July 21, 1942 |
| 2,548,624 | Sclater | Apr. 10, 1951 |
| 2,548,628 | Somerville | Apr. 10, 1951 |
| 2,588,173 | Somerville | Mar. 4, 1952 |
| 2,603,691 | D'Entremont | July 15, 1952 |
| 2,614,158 | Sefton et al. | Oct. 14, 1952 |
| 2,657,456 | Moody | Nov. 3, 1953 |

FOREIGN PATENTS

| | | |
|---|---|---|
| 106,986 | Great Britain | June 14, 1917 |
| 624,137 | Great Britain | May 27, 1949 |